United States Patent [19]
Diedrich et al.

[11] Patent Number: 6,092,900
[45] Date of Patent: Jul. 25, 2000

[54] METHOD AND APPARATUS FOR REDUCING THE FORMATION OF SPOTS IN LASER PROJECTION

[75] Inventors: Frank Diedrich, Germering, Germany; Andreas N. Dorsel, Menlo Park, Calif.

[73] Assignee: Hewlett-Packard Company, Palo Alto, Calif.

[21] Appl. No.: 08/873,209

[22] Filed: Jun. 11, 1997

[51] Int. Cl.[7] ................................................. G03B 21/14
[52] U.S. Cl. ........................... 353/122; 359/446; 359/227
[58] Field of Search .................................... 353/122, 121; 359/445, 446, 452, 228, 229, 227, 443

[56] References Cited

U.S. PATENT DOCUMENTS

| | | | |
|---|---|---|---|
| 2,287,556 | 6/1942 | Land ......................................... | 359/452 |
| 3,650,608 | 3/1972 | Baker ....................................... | 350/320 |
| 4,143,472 | 3/1979 | Muratd et al. .............................. | 35/66 |
| 4,143,943 | 3/1979 | Rawson ................................... | 359/446 |
| 4,184,762 | 1/1980 | Guzman .................................... | 355/1 |
| 4,401,368 | 8/1983 | Drechsel et al. .......................... | 359/446 |
| 4,666,248 | 5/1987 | van de Ven ............................... | 350/128 |
| 5,270,752 | 12/1993 | Kataoka et al. ......................... | 353/122 |
| 5,313,479 | 5/1994 | Florence ................................... | 372/26 |
| 5,361,163 | 11/1994 | Matsuda et al. ........................ | 359/452 |
| 5,416,617 | 5/1995 | Loiseaux et al. ........................ | 359/452 |
| 5,485,308 | 1/1996 | Hirata et al. ............................. | 359/457 |

*Primary Examiner*—William Dowling

[57] ABSTRACT

A projection surface includes scattering microparticles that are in constant motion in relation to each other and to a source of laser radiation in a laser projection system. The microparticles reduce the formation of spots that normally occur when viewing the contents of images which are uniformly illuminated by means of laser projection and which are reflected off a projection surface. The microparticles are formed in a suspension fluid and move due to Brownian molecular motion. The fluid is warmed to further increase motion of the microparticles or a piezoelectric force or other mixing mechanism is used to cause turbulence that also increases motion and mixing of the microparticles.

16 Claims, 1 Drawing Sheet

METHOD AND APPARATUS FOR REDUCING THE FORMATION OF SPOTS IN LASER PROJECTION

BACKGROUND OF THE INVENTION

This invention relates to a system for reducing the formation of spots when viewing images which are uniformly illuminated by means of laser projection and which are reflected off a projection surface.

Laser projection uses a raster procedure to produce images. In the raster procedure, three primary colors red, green, and blue are emitted from a laser. The three colors are modulated separately, brought together again, and scanned over a surface. The image is then formed by points, as in the standard television picture tube. The color of an image point is defined by the relative power of its primary color components. Normally the beam is deflected horizontally by a polygonal mirror and vertically by a galvanometric scanner.

The laser beam causes image irregularities (spots) or so-called speckles in the laser image projection due to the spatial coherence of the laser light. The effect can be observed by shining a diverged laser beam onto a wall. The eye of a viewer sees a spot with a stochastic light-dark distribution, instead of a uniformly illuminated field.

The spots are perceived when light is reflected off a projection surface and to the eye. The projection surface has areas which are uneven compared with the size of the light source wavelength. The light reflected off these uneven surface areas of the projection surface reach the eye with different phase positions creating interference that is perceived in the eye. From a given standpoint of the observer, this interference produces a spatial two-dimensional light-dark pattern.

A laser projection system is described in European Patent No. EP0589179A1 where laser radiation consisting of three primary colors is passed through a diffusion element in a common optical path. The diffusion element rotates in the range from 30 to 40 rpm to prevent the formation of spots due to interference phenomena and creates a clearer, truer-color image.

A projection light image display system with reduced spot formation is also described in European Patent No. EP0385706. A coherent light source is used to produce a light beam. A light modulator directs the light from the source onto the display screen reproducing an image. The screen is coupled with a transducer that creates acoustic surface waves in the screen where the image is reproduced. The acoustic waves possess an amplitude which is greater than the wavelength of the light beam. The surface waves are suppose to prevent the formation of spots when viewing uniform image contents taking advantage of the fact that the eye is not quick enough to perceive the moving interference pattern created by the surface waves.

A system is also described in U.S. Pat. No. 5,313,479, in which a rotating diffusion element is arranged in the optical path of the laser. The diffusion element moves the interference pattern so quickly that it cannot be perceived by the human eye.

The systems described above require mechanical transducers and, therefore, are relatively expensive.

Thus, a need exists for a less complex and expensive system for reducing interference in light image display systems.

SUMMARY OF THE INVENTION

A projection surface provides a simple and inexpensive system for reducing the formation of spots during laser projection that does not require technically complex or expensive conversion procedures or equipment. The projection surface includes scattering microparticles that are in constant motion relative to each other and a source of laser radiation of the laser projection. The microparticles reduce the formation of spots that normally occur when viewing the contents of images which are uniformly illuminated by means of laser projection and which are reflected off a projection surface.

The projection surface is made in such a way that although the image irregularities (spots) or speckles still occur, they are variable in time so that the two-dimensional light-dark pattern, when seen over the reaction time of the eye, is averaged out. Thus, the viewer perceives a uniform brightness.

In one embodiment of the invention, the microparticles are formed in a suspension fluid. Due to Brownian molecular motion in the fluid, the microparticles continue to move. The fluid is warmed to further increase motion of the microparticles. In another embodiment of the invention, a piezoelectric force is used to further increase motion by causing turbulence in the microparticles. It is also advantageous to constantly mix the particles to prevent settling. Both embodiments are relatively simple and are resistant to interference.

In place of a solid projection wall, the projection surface has mobile scattering centers. These scattering centers are implemented by suspending the microparticles in the fluid. The motion of the microparticles create a large number of different light/dark patterns during illumination by the laser spot. The eye perceives the patterns as a uniform image for uniform image contents.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 1b shows a schematic longitudinal sectional view of the laser projection arrangement shown in FIG. 1a.

DETAILED DESCRIPTION

Figure 1A:
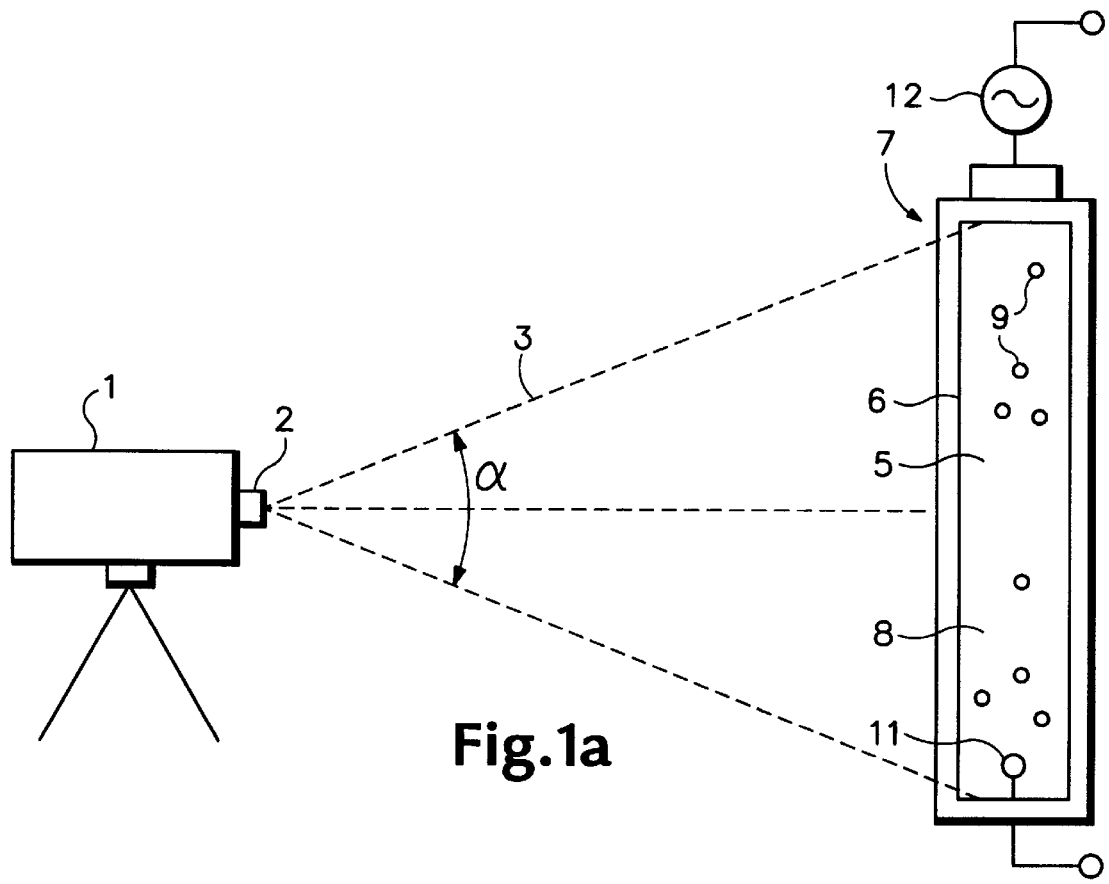
FIG. 1a shows a schematic top view of a laser projection arrangement with a fluid projection surface according to the invention.
Figure 1B:
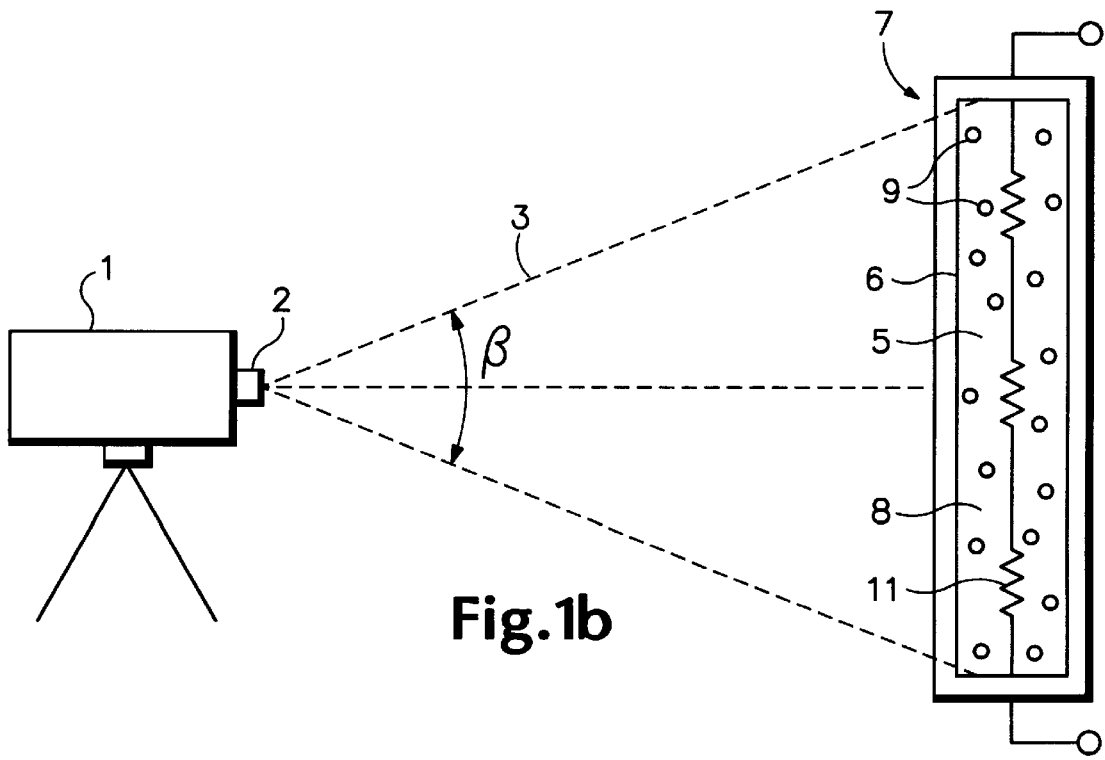

Referring to FIGS. 1a and 1b, the laser projection system according to the invention includes a projection device 1 that has three coherent sources of radiation 3 for the primary colors red, blue, and green in the form of lasers, as is described in U.S. Pat. No. 5,313,479 to Florence. The laser radiation 3 produced exits the projection device 1 through an exit opening 2 and strikes a projection surface 5. The laser radiation beam 3 is deflected in the azimuth range of angle α by means of a polygonal mirror guided around a vertical axis (not shown), and in height in the range of angle β by galvanometric scanners (not shown).

The azimuth angle α is typically within the range of 30–90 degrees and the height angle β is typically in the range of 25–50 degrees. Means of varying the azimuth angle and height angle using polygonal mirrors and galvanometric scanners, respectively, are known to those skilled in the art and are, therefore, not described in detail.

The projection surface 5 is provided within a housing 7. A transmitting boundary surface 6 resides on a side facing the projection device radiation source. The transmitting boundary surface 6 and housing 7 are shown schematically and contain a suspension fluid 8 with light scattering particles 9. The scattering particles 9 scatter the laser beam 3 entering through the boundary surface 6. The motion of the particles 9 prevents the formation of an interference pattern. The deflection due to the motion of particles 9 is greater than the wavelength of the reflected light 3. Thus, the eye of a viewer does not perceive changes in phase position in the laser beam 3.

The largest average diameter of the particles 9 is on the order of 100 μm or less. Due to Brownian motion, the suspension fluid 8 constantly moves at room temperature sufficiently to prevent interference patterns. An alternative embodiment, heats suspension fluid 8 with additional heating resistors 11 to increase the Brownian motion and to further reduce spot formation in the eye of the viewer when viewing the projection surface 5.

The motion of the particles 9 in the suspension fluid 8 is also increased by using piezo oscillators 12 acting on one or several membrane that each comprise scattering particles in a suspension material. The piezo oscillators 12 force even mixing of the scattering particles in the suspension fluid. The deflection path of the particles 9 caused by the effect of the piezoelectric force is also above the wavelength of the reflected laser light 3.

FIGS. 1a and 1b show the projection surface 5 in a top sectional view and a longitudinal sectional view, respectively. The vertical section in FIG. 1b shows a projection surface suitable for motion picture/television or video purposes. The projection housing of the laser projection device 1 should ideally be located not too far above the height of the viewer so the scattered light is headed toward the eyes of the viewer. The radiation from laser light 3 passes through the transmitting boundary surface 6 and is reflected by the projection surface 5 made up of light scattering particles 9.

One embodiment of the invention uses milk as the projection surface 5. The milk contains coagulated protein and fat particles 9 suspended in water 8. The milk is illuminated by the laser radiation 3. A spot observed on the surface of the milk produces more uniform brightness compared with the same laser spot when shone onto solid cardboard.

The medium causing the required back-scatter could be a suspension of glass spheres of very small particles such as aluminum oxide particles or silicon oxide particles suspended in either water or oil. The suspension material 8 can alternatively be a gas or any alternative material that can evenly suspend scattering particles. Mechanical and electronic devices, other than the piezoelectric transducer 12, can be used to keep the scattering particles 9 evenly mixed in the suspension material 8.

The scatter length over which all but a fraction of the incoming laster beam 3 is scattered should not be large compared to the depth of the cell in order to have good power efficiency. This is controlled by particle concentration in the suspension material 8 or by choosing the cell depth accordingly. The function of the liquid 8 is to move the particles sufficiently by diffusion over the retinal integration time. Also, it is advantageous to make the scatter length comparable to or smaller than the desired lateral resolution so that photon diffusion, as opposed to particle diffusion, does not cause image blur. The angular distribution of scattered light is optimized by controlling the shape and size (distribution) of the scattering particles 9.

Having described and illustrated the principles of the invention in a preferred embodiment thereof, it should be apparent that the invention can be modified in arrangement and detail without departing from such principles. I claim all modifications and variation coming within the spirit and scope of the following claims.

We claim:

1. A projection surface for reducing interference patterns perceived in a laser light image transmitted from a laser radiation source in a laser projection system, comprising:

a suspension material that includes multiple light scattering microparticles constantly in motion relative to each other and to the laser radiation source of the laser projection system, the suspension material scattering the laser light image and varying interference patterns in time thereby preventing perception of the interference patterns.

2. A projection surface according to claim 1 wherein the suspension material comprises a fluid and the constant motion of the microparticles is produced by Brownian motion.

3. A projection surface according to claim 2 including a heater for warming the fluid to increase motion in the microparticles.

4. A projection surface according to claim 2 including means for increasing mixing of the microparticles in the suspension material.

5. A projection surface according to claim 4 wherein the mixing means comprise a piezoelectric transducer that increases fluid turbulence in the suspension material.

6. A projection system for reducing spot formation in reflected images, comprising:

a projection device transmitting images with a light source having a given wavelength; and a projection screen including scattering microparticles suspended in a suspension material and moving in relation to the light source, the microparticles deflecting the light distances greater than the given wavelength of the reflected light source thereby reducing perceived phase interference.

7. A system according to claim 6 wherein the projection screen includes a boundary surface that faces the light source and transmits visible light.

8. A system according to claim 7 wherein the suspension material in the projection screen comprises a coagulated protein.

9. A system according to claim 8 wherein the suspension material includes fat particles.

10. A system according to claim 6 wherein the microparticles comprise aluminum oxide particles.

11. A system according to claim 6 wherein the microparticles comprise silicon oxide particles.

12. A system according to claim 6 wherein the microparticles are less than 100 μm in diameter.

13. A system according to claim 6 wherein the suspension material comprises water.

14. A method for projecting images with a laser light source onto a projection screen, comprising:

suspending light scattering microparticles in a projection screen suspension material;

moving the microparticles in relation to each other and the laser light source; and deflecting the laser light off of the scattering microparticles in the projections screen while the microparticles are in motion, to thereby vary over time interference patterns of the laser light for reducing perceived phase interference in the laser light.

15. A method according to claim 14 including increasing the movement of the microparticles by heating the projection screen.

16. A method according to claim 14 including increasing the movement of the microparticles by applying a piezoelectric force or other mixing mechanism to the projection screen.

* * * * *